UNITED STATES PATENT OFFICE.

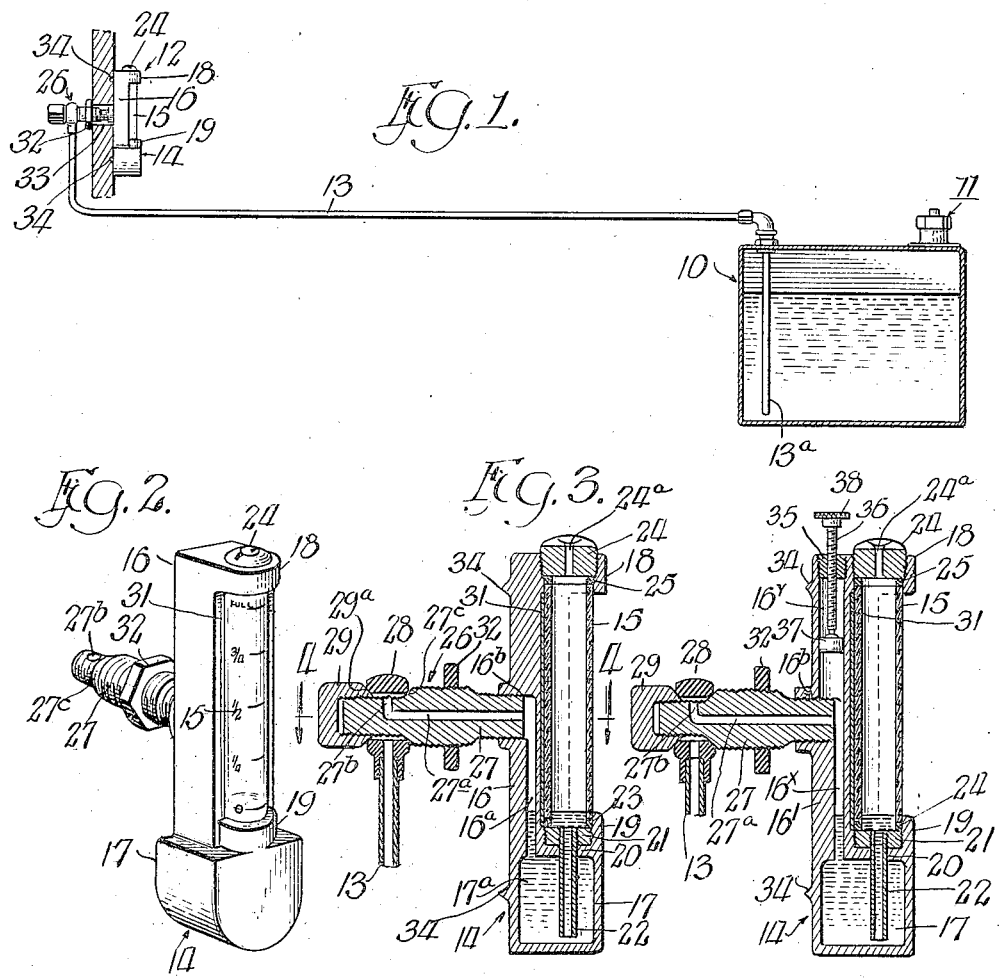
M. ROCKSTEAD.
GAGE DEVICE.
APPLICATION FILED JUNE 30, 1916.
1,269,512. Patented June 11, 1918.
Inventor
Martin Rockstead

MARTIN ROCKSTEAD, OF CHICAGO, ILLINOIS.

GAGE DEVICE.

1,269,512.  Specification of Letters Patent.  Patented June 11, 1918.

Application filed June 30, 1916. Serial No. 106,749.

*To all whom it may concern:*

Be it known that I, MARTIN ROCKSTEAD, a citizen of the United States, and a resident of Chicago, in the county of Cook and State of Illinois, have invented certain new and useful Improvements in Gage Devices; and I do hereby declare that the following is a full, clear, and exact description thereof, reference being had to the accompanying drawings, and to the letters of reference marked thereon, which form a part of this specification.

This invention relates to improvements in gage devices for indicating the level of a liquid in a tank at a point or place removed from the point of inspection, and consists of the matters hereinafter described.

The invention is more particularly intended for use with automobiles to indicate the amount of gasolene contained in the supply tank and to make it possible for the driver, by means of a device fixed to the dash board of the automobile, along with the other and usual metrical devices placed there, to see at a glance, without moving from his seat, the amount of gasolene he has to go on.

The many advantages of my invention will appear as I proceed with my specification.

In the drawings:

Figure 1 is a view showing my improved gage device in side elevation as it appears when connected to the tank of an automobile, and applied to the dash board of the automobile.

Fig. 2 is a perspective view of the gage tube with its supporting bracket.

Fig. 3 is a vertical central section through the same.

Fig. 4 is a view representing a transverse section through the parts as illustrated in Fig. 3, in a plane indicated by the line 4—4 of Fig. 3.

Fig. 5 is a sectional view similar to that shown in Fig. 3 illustrating a somewhat modified form of the construction.

Referring now to that embodiment of my invention illustrated in the drawings: 10 indicates a tank containing the liquid, the level of which is to be indicated on the gage device. This tank as shown is of the familiar form of an automobile tank and is adapted to be filled through a nipple and apertured filler cap 11, of familiar form. 12 indicates the gage tube as a whole which in this case is applied to the dash board of the automobile. 13 indicates a pipe which connects the gage tube with the tank, the contents of which are to be measured.

The gage tube 12 comprises a metal casing 14 and a glass or other transparent tube 15. The casing 14 consists of an upright back piece 16; of a chambered bottom piece 17; and of vertically spaced rings 18 and 19 which project forwardly from the back piece and provide a setting for the glass tube 15.

The bottom ring 19 is closed by a wall 20 which forms the top of a chamber 17ª within the bottom piece 17. An apertured nut 21, threaded into this bottom ring, provides a support for a tube 22, of small diameter which is fixed to it and which depends through an aperture in the said wall 20 into the chamber 17ª. Said tube 22 extends almost to the bottom of the chamber 17ª. The bottom end of the glass tube 15 rests upon a gasket 23, made of elastic material such as rubber or the like, placed on top of the nut 21. The upper end of the tube 15 is embraced by the top ring 18 and the tube is held in place by means of a threaded plug 24 which is screwed into the top ring 18. A second gasket 25 is interposed between the plug 24 and the top of the glass tube. Manifestly, the ends of the tube may be tightly sealed against the respective gaskets 23 and 25 by means of the threaded plug 24.

The chambered bottom piece 17 of the casing is extended somewhat at each side of the back piece 16 to provide room for an excess of liquid to more than fill the tube 15 without uncovering the bottom of the tube 22. A vertical passageway 16ª extends upwardly in the back piece 16 from the chamber 17ª. The pipe 13 is connected to the back piece by means of a connecting device 26.

The connecting device 26 is detachable to separate the gage tube back piece 16 from the pipe 13, and preferably comprises an apertured plug 27, a spanner ring 28 and a locking thimble 29. The inner end of the plug 27 is threaded into a hole 16ᵇ in the back piece 16 of the gage and has a central aperture or passageway 27ª which opens through its end and communicates with the passageway 16ª in the back piece. The other end 27ᵇ of said passageway 27ª is turned at an angle and opens through the peripheral surface of the plug 27. The outer end of the said plug is reduced in diameter and is threaded to receive the thimble 29. The spanner ring 28 is of somewhat larger diameter than the part of the plug upon which it is placed and thus provides an annular space about the plug which communicates with the end 27$^b$ of the passage 27$^a$. Said ring is locked in place between the tapered inner ends 29$^a$ of the thimble 29 and an oppositely tapered part 27$^c$ on the plug 27 at the point where the plug is reduced in diameter. The spanner ring 28 has a tubular apertured extension in which the pipe 13 is fixed and by means of which the annular space about the plug defined by said ring is made to communicate with said pipe. The rear end 13$^a$ of the pipe 13 depends into the tank 10 to a point near its bottom. The threaded plug 24 closing the top of the glass tube 15 is provided with an aperture 24$^a$ so as to subject the contents of the glass tube to atmospheric pressure.

The chamber 17$^a$ in the gage tube is filled to a level such for example as that indicated in the drawings, with a liquid which will neither freeze nor be subject to evaporation under the ordinary extremes of temperature. I prefer to use glycerin for this purpose. The level named marks the lowest or zero point of the gage device.

The parts are connected to the tank as described when the tank is empty or substantially empty, as when there is just sufficient gasolene or other liquid in the tank to seal the end 13$^a$ which depends as described to a point near the bottom of the tank. The tank is now filled to its complete capacity. The passage 16$^a$ in the back piece of the gage device, the pipe 13, and the several passages connecting the pipe and the aforesaid passage 16$^a$ contain a column of air. The surface of the gasolene in the tank and the surface of the glycerin in the gage tube are both subject to atmospheric pressure. As the gasolene in the tank rises, it will rise in the depending end 13$^a$ of the pipe 13 and will thus bodily move the column of air in the pipe 13 in the passage 16$^a$ and in the connecting passages, and will thus be made to bring pressure on the top surface of the glycerin in the chamber 17$^a$ so as to force said glycerin upwardly in the glass tube 15. The parts should be so designed that when the tank is full, the glycerin will be forced to a point near the top of the glass tube 15. The parts of the tube in between the point in which the glycerin stands in the tube when the tank is full and the point at which it stands when the tank is empty may be graduated in any convenient or desirable manner to indicate either gallons or proportional amounts of the tank, as for example, one-quarter full, one-half full, three-quarters full, etc.

As the tank is emptied in the use of the gasolene, and the level of the gasolene therein falls, the column of air in the pipes will be forced to move in a reverse direction by reason of a corresponding fall of the level of the glycerin in the glass tube, since both the said glycerin and the gasolene are under the same pressure conditions as to the outside atmosphere. Thus, manifestly, any level in the tank will be indicated proportionally by the level of the glycerin in the tube 15.

As the pipe 13 is comparatively small in diameter, and the column of air confined therein correspondingly small, it will be manifest that the rise and fall of the liquid in the large tank may be suitably and proportionally indicated in a glass tube 15 of comparatively short length.

In order that the level of the glycerin in the glass tube 15 may stand out clearly and be brightly defined against the gage marks on the tube, I place back of the glass tube a sheet 31 of white paper or other suitable material which is bent about the back of the tube and which is confined between said tube and the metal back piece 16.

As I have pointed out, any suitable liquid may be used in the gage tube but I prefer glycerin, not only for the reasons already named but also because in rising and falling within the glass tube 15 it will not stick to the inner surface of the glass tube, but in its rise and fall will leave a clean surface so that the level in the tube 15 may be accurately observed.

Any suitable means may be used for attaching the gage tube to the dash board in case of its use with an automobile. As shown, the body of the plug 27 of the accompanying device is threaded and a nut 32 screwed thereon which, after the coupling device has been inserted through a suitable opening 33 in the dash board, may be used to draw the back piece of the gage device tightly against the front face of the dash board. To hold the gage tube in proper position it is preferably provided with engaging points 34 on its rear face which, when the nut is drawn up, will be embedded in the front face of the dash board.

As the column of air confined between the top surface of the glycerin or other liquid in the gage device and the top surface of the liquid in the tank will vary in length under changes of temperature, the level of the liquid in the gage tube for certain levels in the tank will vary to some extent with the temperature. Thus, the gage device adjusted for summer use would be an inaccurate adjustment for winter use. It is to overcome this difficulty that I have provided the modification shown in Fig. 5. In this case the parts are all constructed and arranged as before (like parts being indicated by like numerals of reference) except the back piece, which is indicated at 16'. 16ˣ indicates the passageway in the back piece 16'. This is extended vertically to the top of the back piece and is somewhat enlarged above the connecting device 26 as indicated at 16ʸ. The top of this passageway is closed by a plug 35 through which a screw 36 is threaded. A piston plug 37 is attached to the bottom end of said screw in such manner that the screw may be rotated to raise or lower the piston without rotating the piston. Said piston is vertically movable in the upper part 16ʸ of the passageway which thus constitutes a piston chamber. A knurled head 38 is fixed to the outer end of the screw 36.

It is apparent that the piston chamber 16ʸ and the piston 37 with its operating screw provides a means for compressing the column of air confined between the surfaces of the two liquids or for permitting the same to expand. Thus, as will be manifest, by the adjustment provided by this piston, the differences in the length of the column due to changes of temperature may be compensated for.

While in describing my invention, I have referred to certain details of mechanical construction and arrangement, it is to be understood that my invention is in no way to be limited thereby, except as pointed out in the appended claims.

I claim as my invention:

1. In combination with a self propelled vehicle including a dash board and a fuel supply tank, a gage device comprising a casing having an upright, apertured back piece and a bottom piece containing a chamber connected with the aperture in said back piece, a ported plug communicating with the aperture in said back piece and adapted to extend through a hole in said dash board, a nut threaded on said plug, said back piece having lugs adapted to engage said dash board when said nut is tightened upon said plug, a pipe operatively connected to said plug and depending into said tank to a predetermined low level therein, an upright, transparent tube connected to said chamber and open at its top to atmospheric pressure, and a liquid in said chamber, said liquid and the fuel in said tank confining a column of air in said pipe connecting the gage device with said fuel supply tank.

2. In a device of the kind described, a gage and a pipe adapted to connect said gage with a tank and to depend into said tank to a predetermined low level therein, said gage comprising a casing having a chamber in its bottom and a passageway communicating with the top of said chamber and connected to said pipe, said casing also having a piston chamber communicating with said passageway, a piston movable in said chamber and means operable from the outside of the casing for actuating said piston, an upright transparent tube mounted in said casing and open at its top to atmospheric pressure, a tube of less diameter than said transparent tube and connecting the same with said chamber and depending to a point near the bottom of said chamber, and a liquid normally filling said chamber and the lower end of said transparent tube.

In testimony, that I claim the foregoing as my invention I affix my signature in the presence of two witnesses, this 22nd day of May, A. D. 1916.

MARTIN ROCKSTEAD.

Witnesses:
T. H. ALFREDS,
KARL W. DOLL.